US012564856B1

(12) United States Patent
Zhou

(10) Patent No.: US 12,564,856 B1
(45) Date of Patent: Mar. 3, 2026

(54) SPRAY HEAD

(71) Applicant: Guangdong SunRise Industrial Co., Ltd., Dongguan (CN)

(72) Inventor: Wei Zhou, Dongguan (CN)

(73) Assignee: Guangdong SunRise Industrial Co., Ltd., Dongguan (CN)

( * ) Notice: Subject to any disclaimer, the term of this patent is extended or adjusted under 35 U.S.C. 154(b) by 0 days.

(21) Appl. No.: 19/077,074

(22) Filed: Mar. 12, 2025

Related U.S. Application Data

(63) Continuation-in-part of application No. 18/819,053, filed on Aug. 29, 2024.

(30) Foreign Application Priority Data

Jan. 25, 2025 (CN) ......................... 202520173695.7
Feb. 20, 2025 (CN) ......................... 202520279327.0

(51) Int. Cl.
*B05B 15/40* (2018.01)
*B05B 1/18* (2006.01)
*E03C 1/04* (2006.01)

(52) U.S. Cl.
CPC ................ *B05B 15/40* (2018.02); *B05B 1/18* (2013.01); *E03C 1/0408* (2013.01); *E03C 2201/40* (2013.01)

(58) Field of Classification Search
CPC ......... B01D 29/13; B01D 35/04; C02F 1/003; C02F 2307/06; B05B 1/185; B05B 1/18; B05B 15/40; E03C 1/0408; E03C 2201/40
USPC .................................................. 210/449, 767
See application file for complete search history.

(56) References Cited

U.S. PATENT DOCUMENTS

2004/0255377 A1* 12/2004 Mueller .................. B05B 15/40 4/615
2012/0055888 A1* 3/2012 Hunter ................... A47K 3/286 210/767

* cited by examiner

*Primary Examiner* — Akash K Varma

(57) ABSTRACT

A spray head includes a housing, a cap, a filter cartridge, and a panel assembly. The housing defines an inlet port. The cap is detachably connected to the housing. The housing and the cap cooperatively define a filter chamber. The filter cartridge is disposed in the filter chamber and includes an inlet end and an outlet end. Unfiltered water enters the filter cartridge sequentially through the inlet port and the inlet end, and filtered water exits the filter cartridge through the outlet end. The panel assembly defines a plurality of spray holes and a spray chamber. The filtered water enters the spray chamber and is sprayed from the plurality of spray holes. The cap is configured to block the unfiltered water at the inlet end or block the filtered water at the outlet end, and the filtered water enters the spray chamber after being redirected at the cap.

15 Claims, 16 Drawing Sheets

SPRAY HEAD

CROSS-REFERENCE TO RELATED APPLICATIONS

The present application is a continuation-in-part of the U.S. patent application Ser. No. 18/819,053, filed on Aug. 29, 2024; and claims the priority of: the Chinese patent application No. 202520173695.7, filed on Jan. 25, 2025; and the Chinese patent application No. 202520279327.0, filed on Feb. 20, 2025 2025; and contents of which are incorporated herein by their entireties.

FIELD

The present disclosure relates to the field of showers, particularly to a spray head.

BACKGROUND

A shower typically includes a filter cartridge to filter water flow passing through. After prolonged use, a significant amount of impurities accumulate in the filter cartridge, which leads to a decrease in filtration efficiency. As a result, the filter cartridge needs to be replaced regularly. However, in existing showers, an entire spray head should be removed, or a panel assembly of the spray head needs to be disassembled in order to access the filter cartridge, making it difficult to achieve a quick and convenient replacement.

SUMMARY

A spray head is disclosed in the present disclosure. The spray head includes a housing, a cap, a filter cartridge, and a panel assembly. The housing defines an inlet port. The cap is detachably connected to the housing. The housing and the cap cooperatively define a filter chamber. The filter cartridge is disposed in the filter chamber and includes an inlet end and an outlet end. Unfiltered water enters the filter cartridge sequentially through the inlet port and the inlet end, and filtered water exits the filter cartridge through the outlet end. The panel assembly is mounted on the housing and defines a plurality of spray holes and a spray chamber. The filtered water enters the spray chamber and is sprayed from the plurality of spray holes. The cap is configured to block the unfiltered water at the inlet end. The unfiltered water enters the inlet end after being redirected at the cap. Or the cap is configured to block the filtered water at the outlet end, and the filtered water enters the spray chamber after being redirected at the cap.

Figure 1:
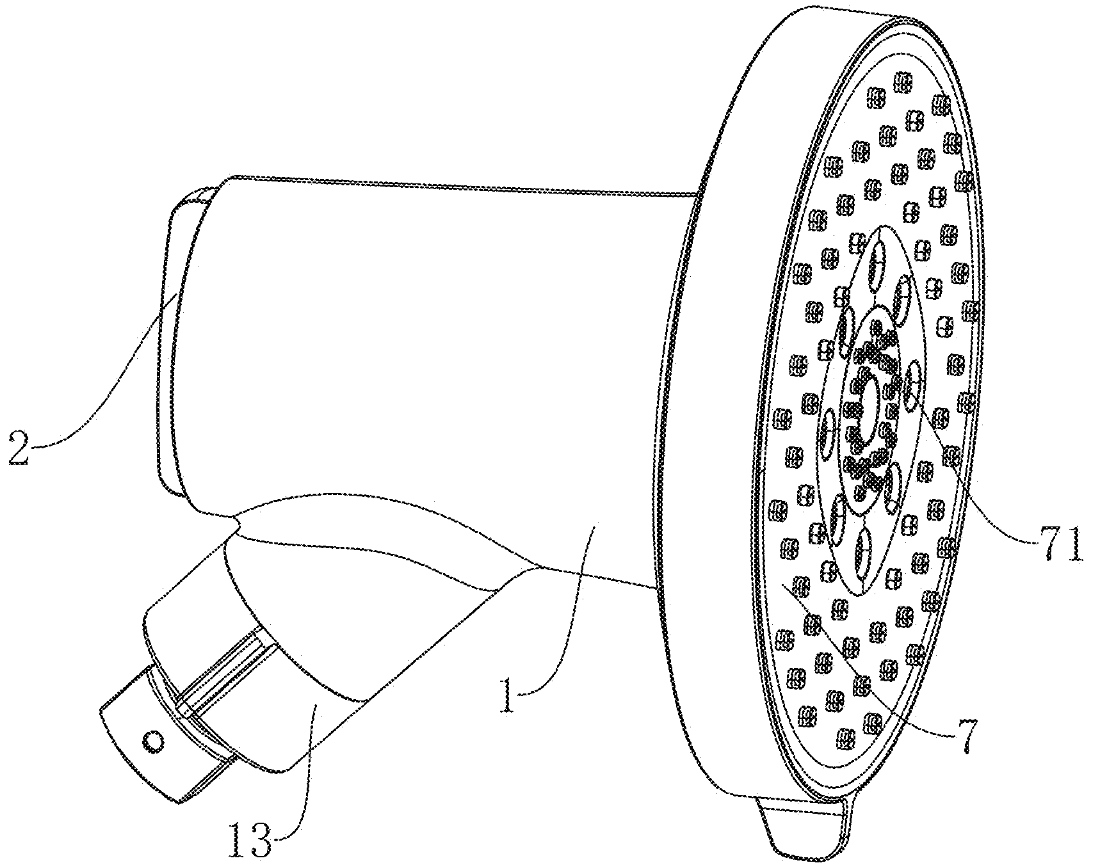
FIG. 1 is a structural view of a first spray head according to an embodiment of the present disclosure.

Reference numerals in the drawings: 1—housing; 11—filter wall; 111—first water flow hole; 112—second side wall; 241—outer vertical wall; 242—inner peripheral wall; 1122—first end; 1121—second end; 113—second end wall; 114—filter chamber; 115—water passage chamber; 12—mounting wall; 121—extending wall; 122—expanding wall; 1201—opening structure; 120—inner side wall; 1202—guiding groove structure; 1211—opening groove; 1212—guiding face; 1213—extending portion; 12131—upper face of the extending portion; 1214—body portion; 12141—inclined face; 1215—guiding portion; 12151—upper face of the guiding portion; 13—inlet pipe wall; 131—inlet port; 132—inlet pipe head; 1321—outlet port; 133—cover; 2—cap; 21—guiding block structure; 22—boss; 23—first end wall; 24—first side wall; 231—third water flow hole; 3—filter cartridge; 31—inlet end; 32—outlet end; 33—both ends of the filter cartridge; 34—chamber; 4—first water passage; 5—second water passage; 6—third water passage; 7—panel assembly; 71—spray hole; 72—spray chamber; 73—second water flow hole; 8—sealing ring; 81—sealing groove.

DETAILED DESCRIPTION

In order to make the objectives, features, and advantages of the present disclosure more apparent and easier to understand, the following detailed description of the specific embodiments of the present disclosure is provided in conjunction with the accompanying drawings.

It should be noted that the terms "first", "second", and so on in the description and claims, as well as in the above drawings, are used to distinguish similar objects and are not necessarily used to describe a specific order or sequence. It should be understood that such data can be interchanged where appropriate, so that the embodiments described in the present disclosure can be implemented in a sequence different from those shown or described herein.

In the description of the present disclosure, it should be noted that unless otherwise explicitly stated and defined, the terms "arranged", "mounted", "connected", and "coupled" should be broadly understood. For example, they may refer to fixed connections, detachable connections, or integral connections; they may refer to mechanical connections; they may refer to direct connections or indirect connections through intermediate media, or communication between two components internally. The specific meaning of these terms in the present disclosure can be understood by those skilled in the art based on the context.

In this description, the terms "embodiment", "one embodiment", and "an embodiment" refer to specific features, structures, materials, or characteristics described in conjunction with that embodiment or implementation. These features may be included in at least one embodiment or implementation of the present disclosure. The illustrative descriptions of these terms in this description do not necessarily refer to the same embodiment or implementation. Additionally, the specific features, structures, materials, or characteristics described may be combined in any suitable manner in any one or more embodiments or implementations.

The following detailed description of the present disclosure will be provided in conjunction with the accompanying drawings.

To solve the above technical problems, in accordance with FIGS. 1-16, a spray head is provided in an embodiment of the present disclosure. The spray head includes a housing 1 and a cap 2. The housing 1 defines an inlet port 131. The housing 1 and the cap 2 are detachably connected to each other and cooperatively form a filter chamber 114. A filter cartridge 3 is arranged in the filter chamber 114. In this way, the filter cartridge 3 is allowed to be replaced and cleaned by removing the cap 2. The filter cartridge 3 includes an inlet end 31 and an outlet end 32. Unfiltered water flows into the housing 1 through the inlet port 131. Upon reaching the cap 2, the unfiltered water is blocked and a flow direction is changed. After the flow direction is bended, the unfiltered water enters the inlet end 31 of the filter cartridge 3. The cap 2 merely acts as a blocking and guiding component, and therefore, removing the cap 2 does not affect a main part of the housing 1, nor does it require an entire spray head to be disassembled. Alternatively, the cap 2 is arranged approximately perpendicular to an outlet direction at the outlet end 32. A panel assembly 7 is mounted on the housing 1. After filtered water exits the outlet end 32, a flow direction of the filtered water is bended at the cap 2 and enters the spray chamber 72 of the panel assembly 7, ultimately being sprayed out through spray holes 71. Therefore, the cap 2 and the panel assembly 7 are independently arranged. The cap 2 serves only as a blocking and guiding component for water flow and is not located in the spray chamber 72 of the panel assembly 7. Removal of the cap 2 does not require opening the panel assembly 7, thus enabling a quick and convenient replacement and cleaning of the filter cartridge 3.

In an embodiment of the present disclosure, as shown in FIGS. 2, 3, 10, and 16, the cap 2 includes a first end wall 23 and a first side wall 24. The first side wall 24 is a side wall arranged to surround the first end wall 23. The first end wall 23 is positioned facing the inlet end 31 of the filter cartridge 3. The cap 2 is spaced apart from the inlet end 31 of the filter cartridge 3. In this way, the first side wall 24, the first end wall 23, and the inlet end 31 of the filter cartridge 3 cooperatively define a first water passage 4 which is bent. The unfiltered water, after entering the filter chamber 114 through the inlet port 131, is delivered via the first water passage 4 to an area between the cap 2 and the inlet end 31 of the filter cartridge 3. In this case, the first end wall 23 functions to block flow of the unfiltered water directly through and instead guides the flow to change direction and enter the inlet end 31 of the filter cartridge 3. It is understood that the first water passage 4 can be formed by a spacing between the filter cartridge 3 and the cap 2, or by providing a pipeline to directly convey the water flow. In the present disclosure, the inlet wall 13 is connected to a filter wall 11 and located proximate the cap 2. Alternatively, the inlet wall 13 can also be directly connected to the first side wall 24 of the cap 2, allowing the unfiltered water to flow directly by the first side wall 24 into the area between the cap 2 and the inlet end 31 of the filter cartridge 3.

Figure 2:
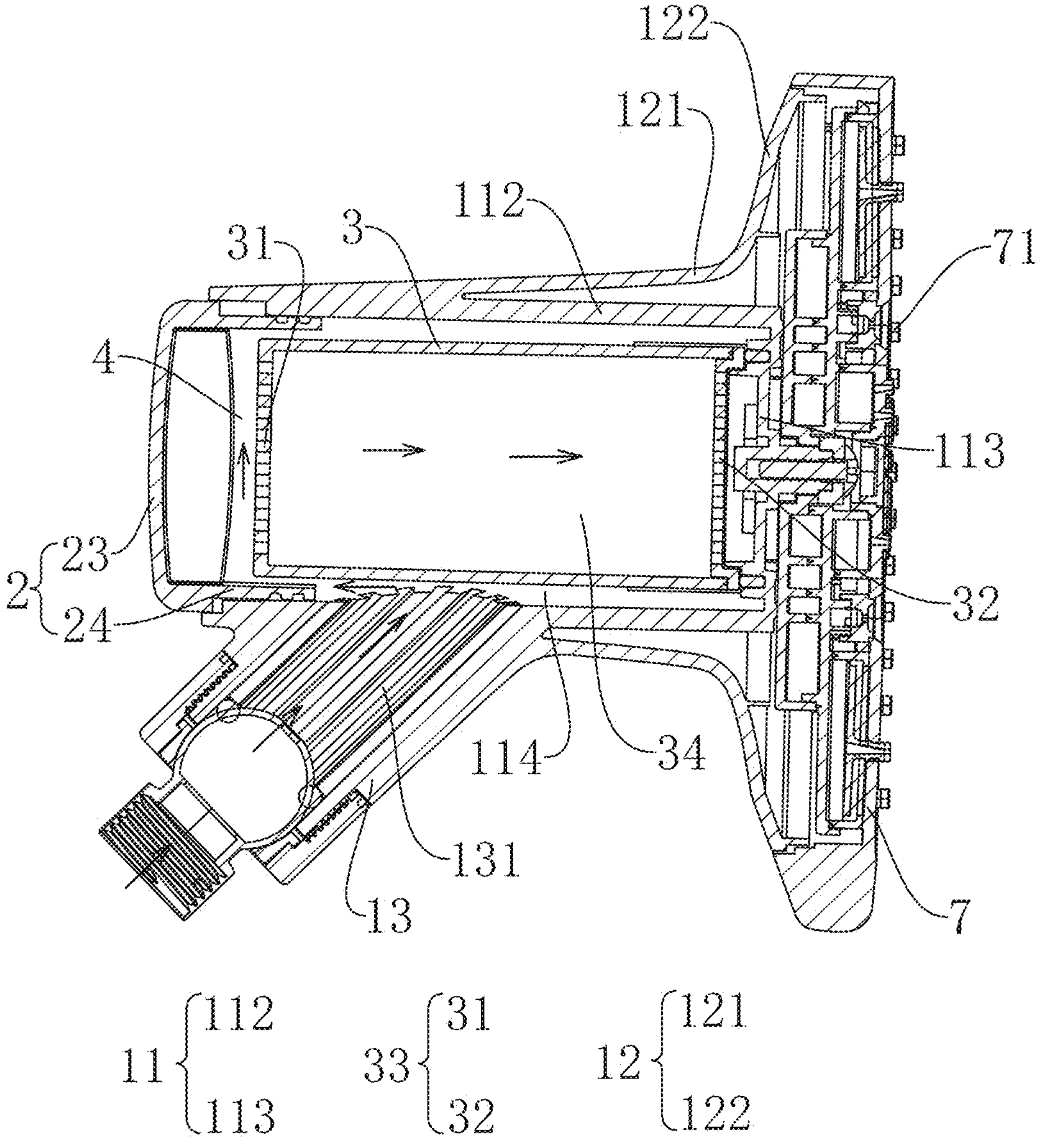
FIG. 2 is a cross-sectional view of the first spray head according to an embodiment of the present disclosure.
Figure 3:
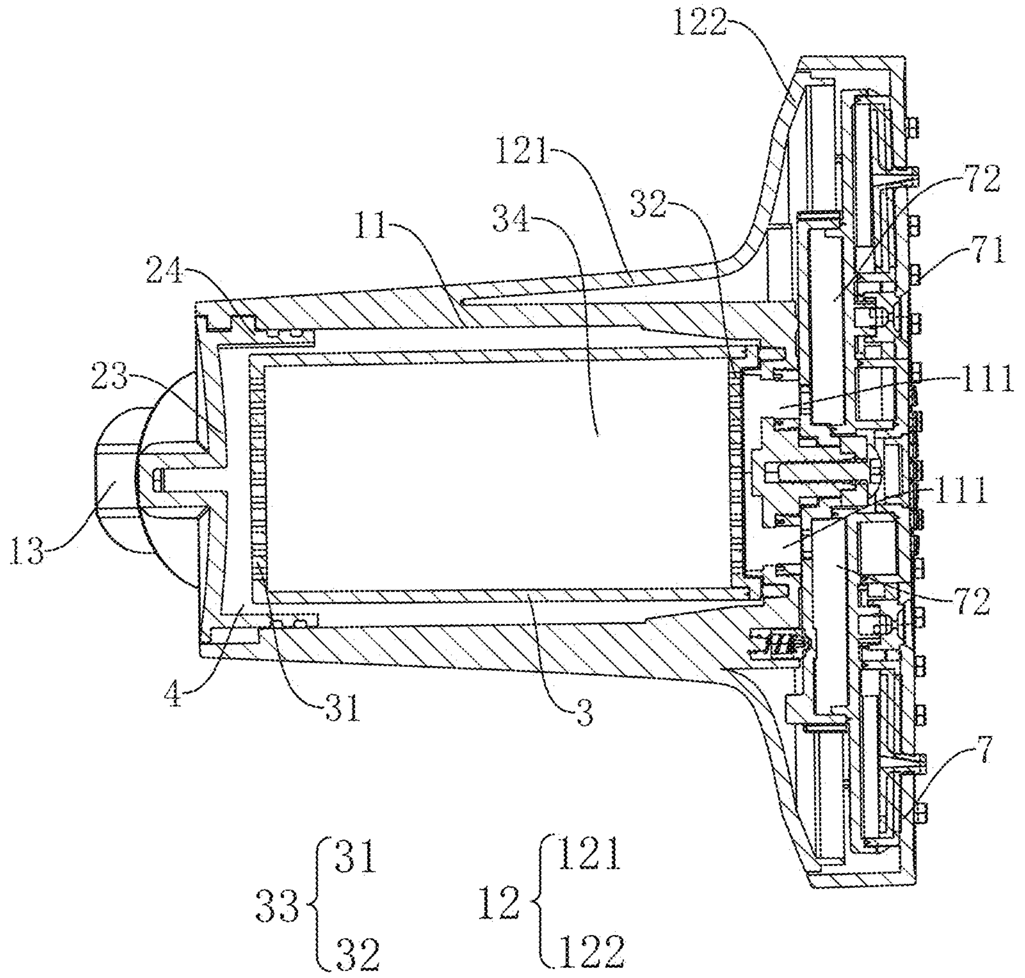
FIG. 3 is another cross-sectional view of the first spray head according to an embodiment of the present disclosure.
Figure 4:
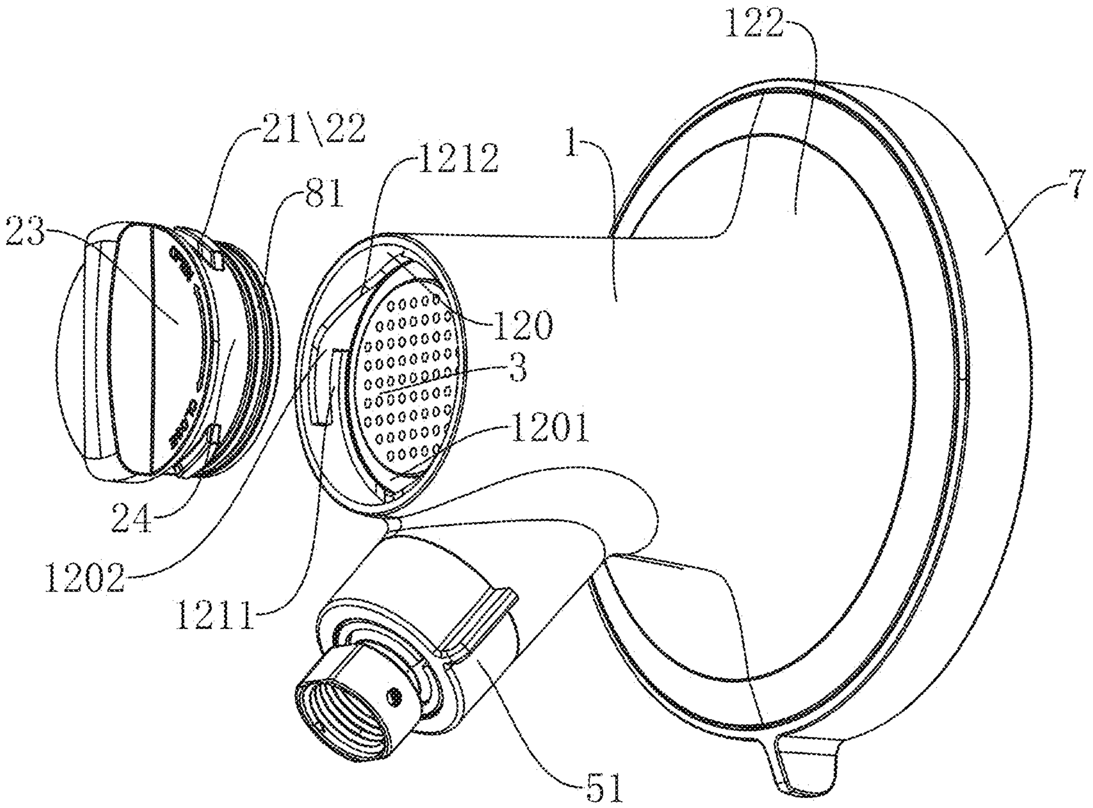
FIG. 4 is a partial exploded view of the first spray head according to an embodiment of the present disclosure.

In an embodiment of the present disclosure, as shown in FIGS. 2-4, the housing 1 includes a filter wall 11, an inlet pipe wall 13, and a mounting wall 12. The filter wall 11 and the cap 2 are detachably connected to each other and cooperatively form a filter chamber 114. The filter cartridge 3 is positioned in the filter chamber 114. The inlet pipe wall 13 is connected with the filter wall 11. The inlet port 131 is defined in the inlet pipe wall 13. The unfiltered water enters the filter chamber 114 through the inlet port 131 formed by the inlet pipe wall 13. Optionally, an end of the filter wall 11 proximate to the inlet end 31 is arranged with an opening structure 1201. The cap 2 is detachably connected to the opening structure 1201. The first end wall 23 of the cap 2 is arranged approximately perpendicular to an inlet direction at the inlet end 31. In this way, when entering the filter chamber 114, the unfiltered water is blocked by the cap 2, and thus the flow direction is changed. Furthermore, under guidance of the cap 2, the unfiltered water flows into the inlet end 31 of the filter cartridge 3 to begin a filtration process. The inlet port 131 is defined in the inlet pipe wall 13, rather than directly defined in the cap 2, thus interference with the inlet port 131 caused by the removal of the cap 2 is avoided. When the user replaces or cleans the filter cartridge 3, only the cap 2 needs to be removed, without needing to disassemble an entire housing 1. The mounting wall 12 includes an extending wall 121 and an expanding wall 122. The extending wall 121 is arranged to surround the filter wall 11, and the expanding wall 122 extends outwardly and forms a mounting opening. The panel assembly 7 is mounted at the mounting opening to block the mounting opening. The panel assembly 7 is positioned proximate to the outlet end 32 of the filter cartridge 3 to facilitate communication between the spray chamber 72 and the outlet end 32, allowing water to be sprayed out through the spray holes 71. Additionally, the filter cartridge 3 has a cavity 34. The cavity is suitable for holding filtration materials such as filter cotton, activated carbon, gravel, ceramic filters, fiber filters, or ion exchange resins to perform fluid filtration.

In an embodiment of the present disclosure, as shown in FIG. 2, an inlet direction of the inlet port 131 corresponds to an inlet direction of the inlet pipe wall 13. Optionally, the inlet direction has an angle with an axial direction of the filter cartridge 3, particularly an acute angle. When the unfiltered water flows into the filter chamber 114 from the inlet port 131, the filter cartridge 3 forces the unfiltered water to change a flow path under a blocking effect, directing the unfiltered water into the first water passage 4, and ultimately, under obstruction of the cap 2, the unfiltered water flows in a detour to enter the inlet end 31. In this way, a volume of the filter chamber 114 can be reduced, which in turn reduces an overall size of the spray head. In the present disclosure, a side wall of the filter cartridge 3, the filter wall 11, and cap 2 cooperatively define a gap. When entering the filter chamber 114 from the inlet port 131, the unfiltered water flows through the gap and is cooperatively directed through the filter cartridge 3, filter wall 11, and cap 2 into the inlet end 31. The gap optimizes distribution and flow state of water flow, allowing the spray head to accommodate a higher water flow rate.

Figure 7:
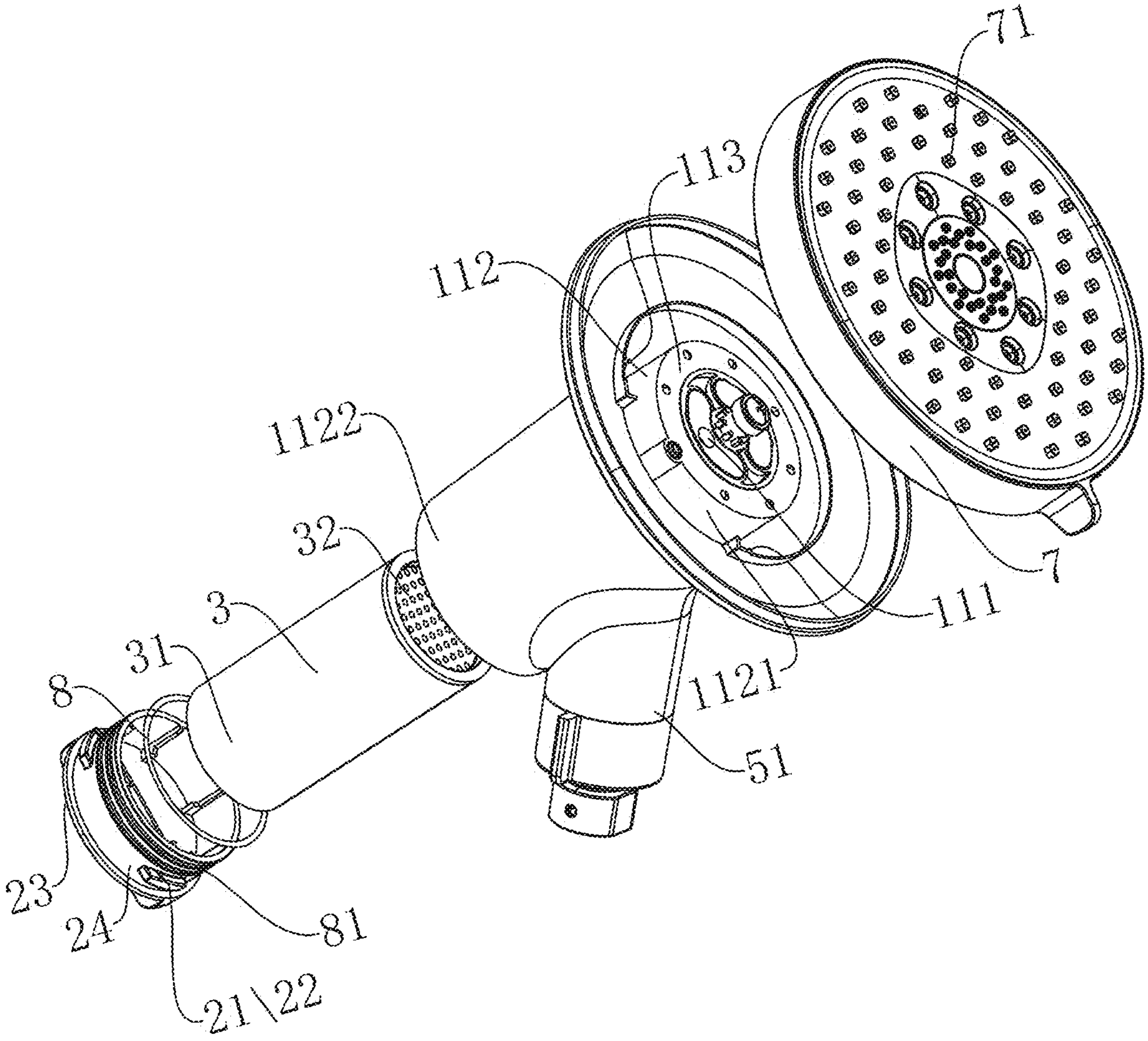
FIG. 7 is an exploded view of the first spray head according to an embodiment of the present disclosure.
Figure 8:
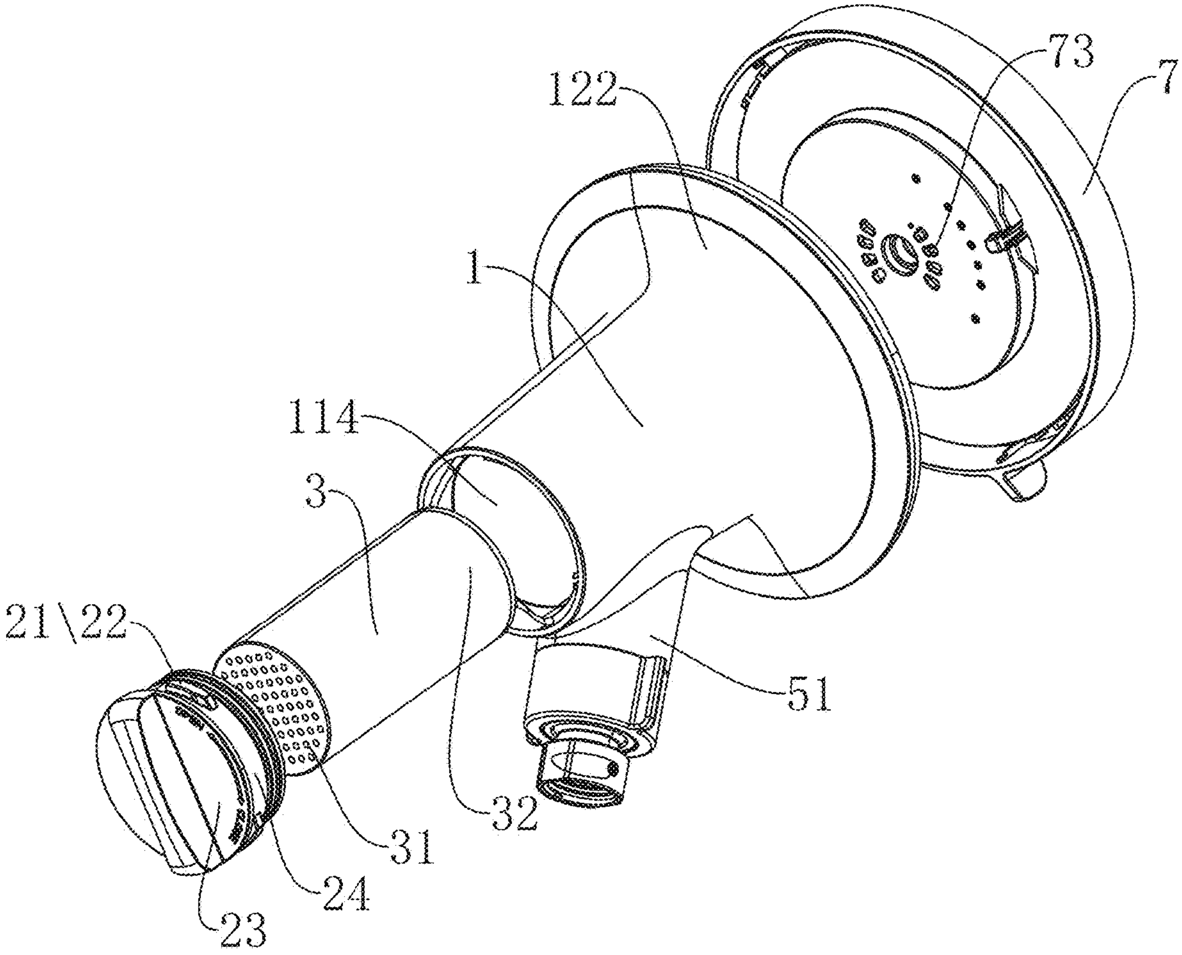
FIG. 8 is another exploded view of the first spray head according to an embodiment of the present disclosure.
Figure 9:
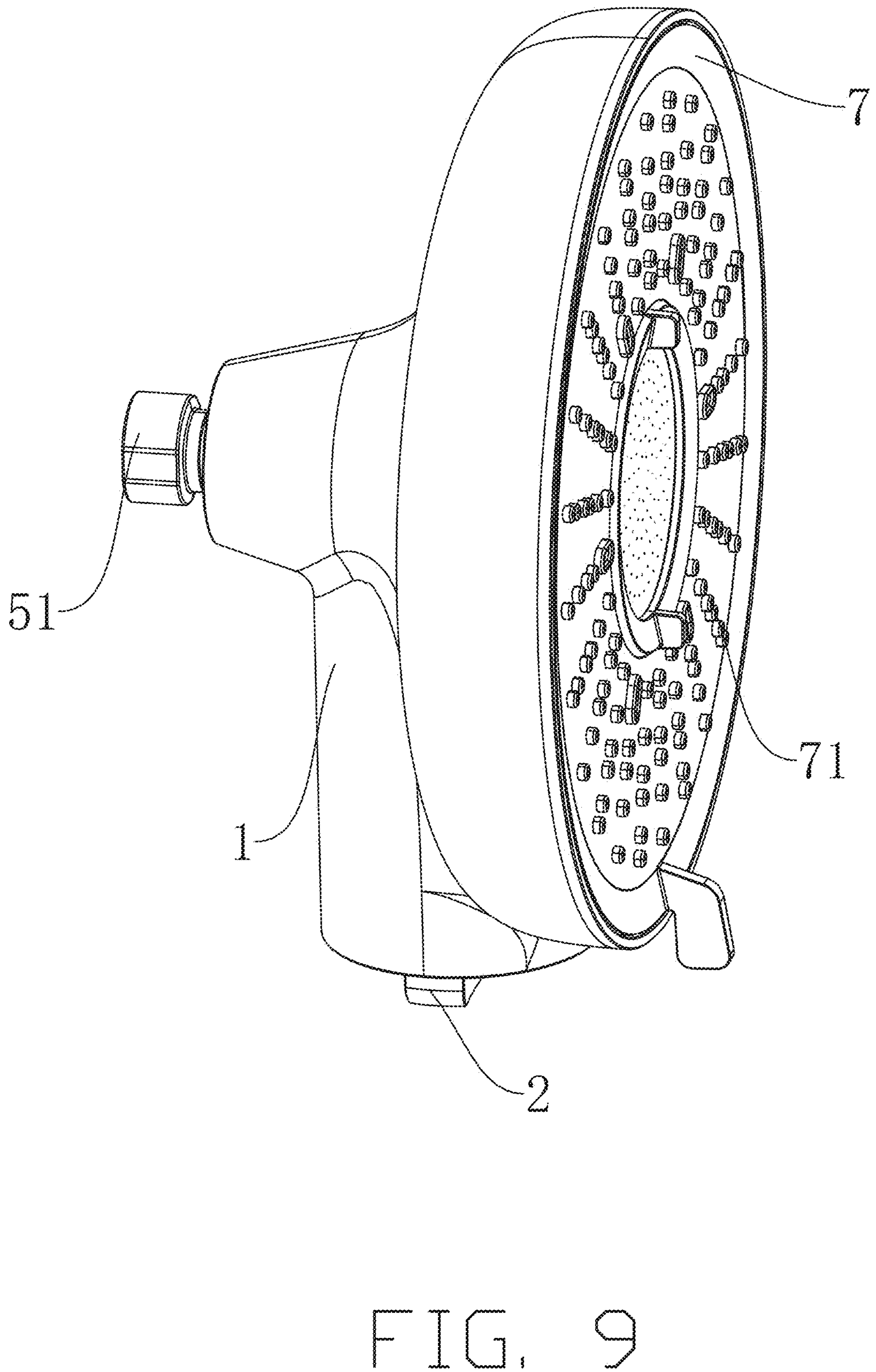
FIG. 9 is a structural view of a second spray head according to an embodiment of the present disclosure.

In an embodiment of the present disclosure, as shown in FIGS. 3, 7, and 8, the filter wall 11 defines at least one first water flow hole 111, and the panel assembly 7 defines at least one second water flow hole 73. The at least one first water flow hole 111 selectively communicates with the at least one second water flow hole 73. The filtered water which has been filtered by the filter cartridge 3 first flows out of the outlet end 32 of the filter cartridge 3, and then passes sequentially through the at least one first water flow hole 111 and the at least one second water flow hole 73, ultimately entering the spray chamber 72. Communication between the at least one first water flow hole 111 and the at least one second water flow hole 73 further optimizes distribution of water flow, preventing issues such as excessive local flow or uneven distribution when the water flow enters the spray chamber 72. Additionally, by properly arranging the number, position, and size of the at least one first water flow hole 111 and the at least one second water flow hole 73, precise control over a water flow speed and a water flow volume can be achieved, thereby improving the spray head's performance and user experience. Furthermore, in the present disclosure, when the number of the at least one second water flow hole 73 is at least two, a second water flow hole 73, which is communicated with a corresponding first water flow hole 111, can be switched to another second water flow hole 73 by rotating the panel assembly 7. Each second water flow hole 73 corresponds to a different spray chamber 72, allowing the user to select corresponding spray holes 71 to release water by rotating the panel assembly 7, thus providing multiple water flow modes for user convenience.

In an embodiment of the present disclosure, as shown in FIGS. 1 and 7, the filter wall 11 is arranged as a hollow cylindrical structure. The filter wall 11 includes a second end wall 113 and a second side wall 112. The second side wall 112 is circumferentially arranged. The second side wall 112 includes a first end 1122 and a second end 1121. The first end 1122 is open, and the cap 2 is detachably mounted to block the first end 1122. The second end wall 113 is located at the second end 1121. Thus, the cap 2 and the second end wall 113 can cooperatively limit two ends 33 of the filter cartridge 3, with the cap 2 limiting one end of the filter cartridge 3 and the second end wall 113 limiting the other end of the filter cartridge 3, thereby ensuring stable installation and precise positioning of the filter cartridge 3 in the filter chamber 114. When the user needs to replace or clean the filter cartridge 3, only the cap 2 needs to be removed, without disassembling the entire housing 1. It is understood that the filter wall 11 can also be arranged in other shapes. In the present disclosure, the filter cartridge 3 is a cylindrical structure, the filter wall 11 is arranged as a cylindrical structure correspondingly. However, when the filter cartridge 3 is arranged in other configurations, a shape of the filter wall 11 can also be changed, as long as the filter wall 11 is capable of forming the filter chamber 114.

In an embodiment of the present disclosure, as shown in FIG. 3, a filtration direction of the filter cartridge 3 is consistent with a water flow direction at the panel assembly 7. In this case, the second end wall 113 is positioned proximate to the outlet end 32 of the filter cartridge 3. Therefore, the at least one first water flow hole 111 is defined in the second end wall 113, and the panel assembly 7 is attached to the second end wall 113. In this configuration, the at least one first water flow hole 111 are directly communicated with the at least one second water flow hole 73 correspondingly. Alternatively, the at least one first water flow hole 111 can also be defined in a portion of the second side wall 112 which is proximate to the panel assembly 7, or a pipeline can also be arranged to facilitate the communication between the at least one first water flow hole 111 and at least one the second water flow hole 73.

Figure 10:
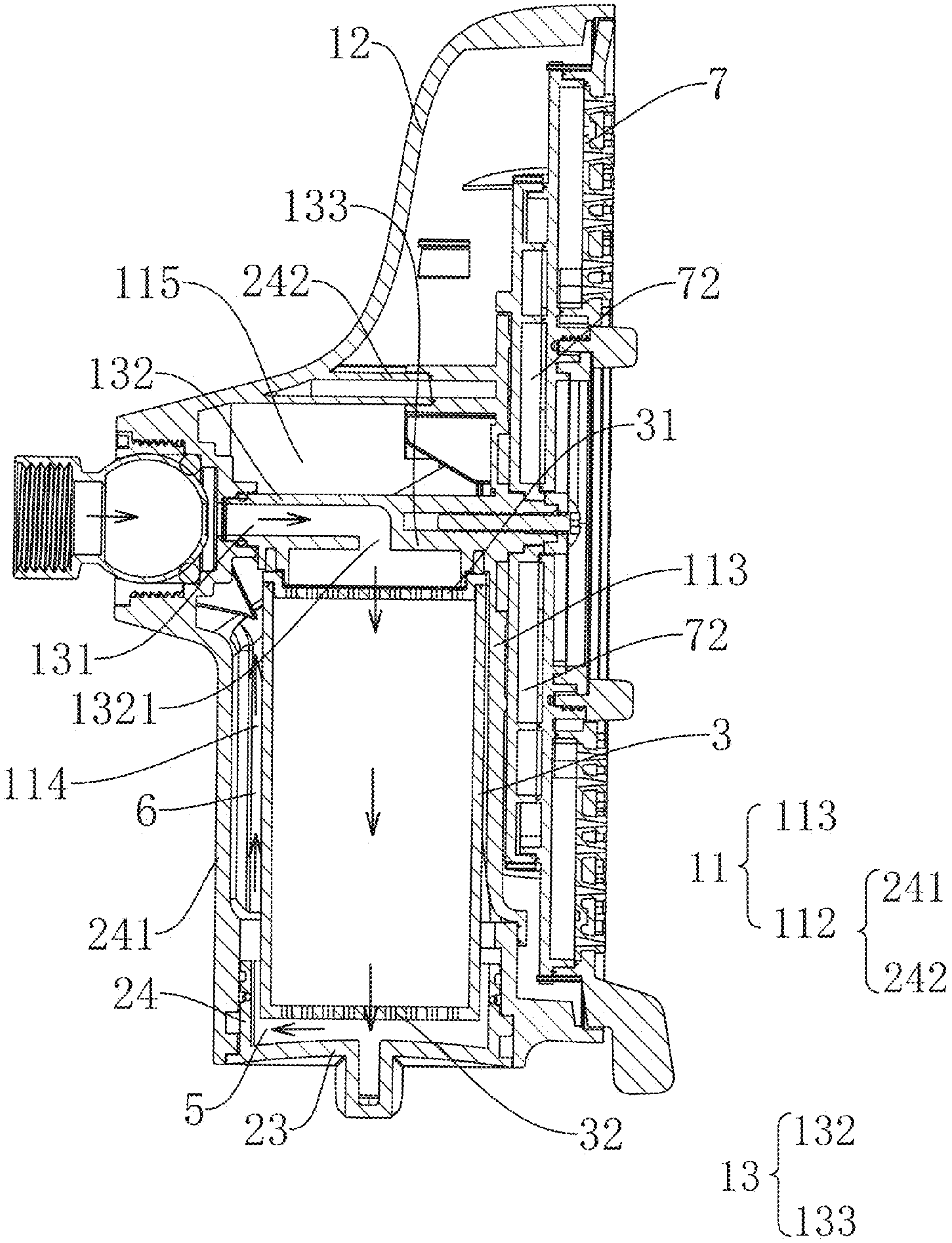
FIG. 10 is a cross-sectional view of the second spray head according to an embodiment of the present disclosure.
Figure 14:
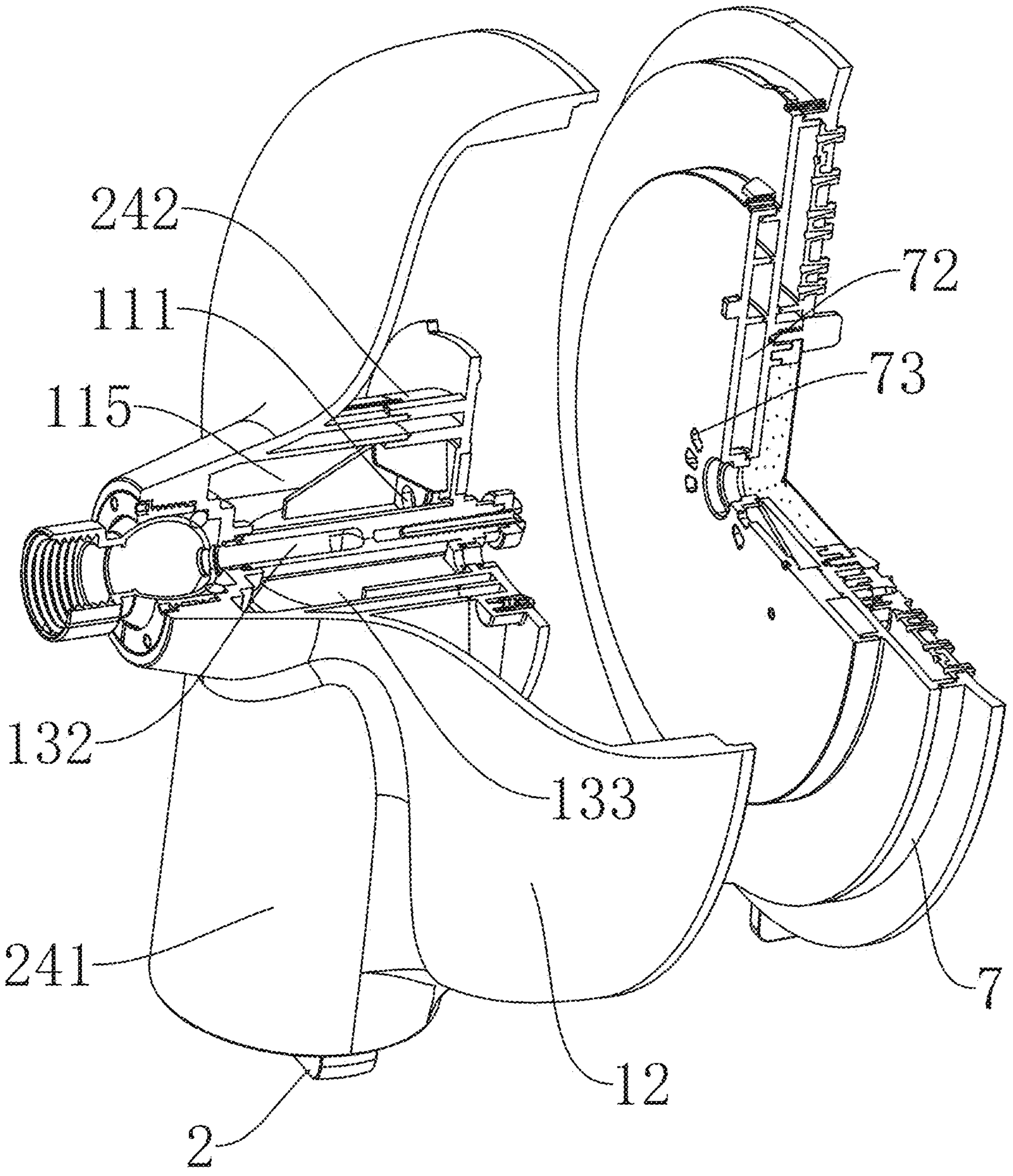
FIG. 14 is another cross-sectional view of the second spray head according to an embodiment of the present disclosure.
Figure 16:
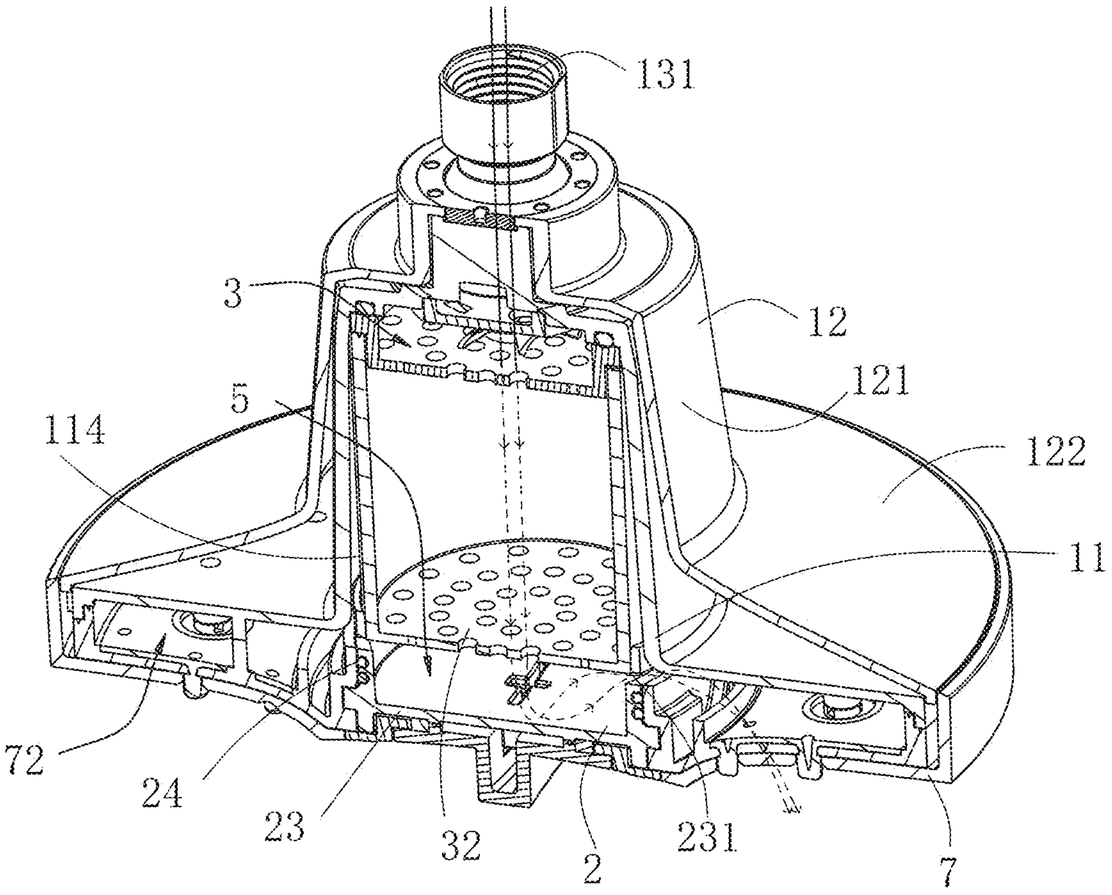
FIG. 16 is a cross-sectional view of the third spray head according to an embodiment of the present disclosure.

In another embodiment of the present disclosure, as shown in FIGS. 10, 14, and 16, the cap 2 includes a first end wall 23 and a first side wall 24. The first side wall 24 is arranged to surround the first end wall 23 as a circumferential side wall. The first end wall 23 is arranged facing an opening of the outlet end 32 of the filter cartridge 3. The cap 2 is spaced apart from the outlet end 32 of the filter cartridge 3. In this way, the first side wall 24, the first end wall 23, and the outlet end 32 of the filter cartridge 3 cooperatively define a second water passage 5 which is bent. After passing through the outlet end 32, the filtered water is delivered through the second water passage 5 into the spray chamber 72. The first end wall 23 acts as a barrier, preventing the filtered water from flowing directly through and instead guiding the filtered water to change direction. Similarly, the second water passage 5 can be formed by the spacing between the filter cartridge 3 and the cap 2, or a pipeline can be arranged to act as the second water passage 5 to directly deliver the filtered water. It is understood that the second water passage 5, defined by the first side wall 24 and the first end wall 23, provides a space for buffering and redirecting the filtered water. While flowing through the second water passage 5, the filtered water bends, which helps to reduce the water flow speed, minimizing impact on walls of the spray chamber 72. At the same time, the filtered water is distributed more evenly, creating better conditions for subsequent spraying process.

In an embodiment of the present disclosure, as shown in FIGS. 10, 11, 14, 15, and 16, the filter wall 11 and the cap 2 are detachably connected to each other and cooperatively form a filter chamber 114. The cap 2 is arranged proximate to the outlet end 32 of the filter cartridge 3. Optionally, the first end wall 23 of the cap 2 is arranged approximately perpendicular to an outlet direction at the outlet end 32. In this way, after entering the filter chamber 114, the filtered water is blocked by the cap 2 and the flow direction of the filtered water is changed, and under guidance of the cap 2, the filtered water flows into the spray chamber 72. The mounting wall 12 is arranged to surround the filter wall 11 and extends outwardly to support and secure the panel assembly 7. The panel assembly 7 is firmly connected to the housing 1 via the mounting wall 12, ensuring stability and aesthetics of an overall structure of the spray head. Design of the mounting wall 12 not only enhances structural strength of the housing 1 but also provides a reliable foundation for installation of the panel assembly 7, allowing the panel assembly 7 to be securely mounted on the housing 1 while also being easy to disassemble and maintain.

Figure 15:
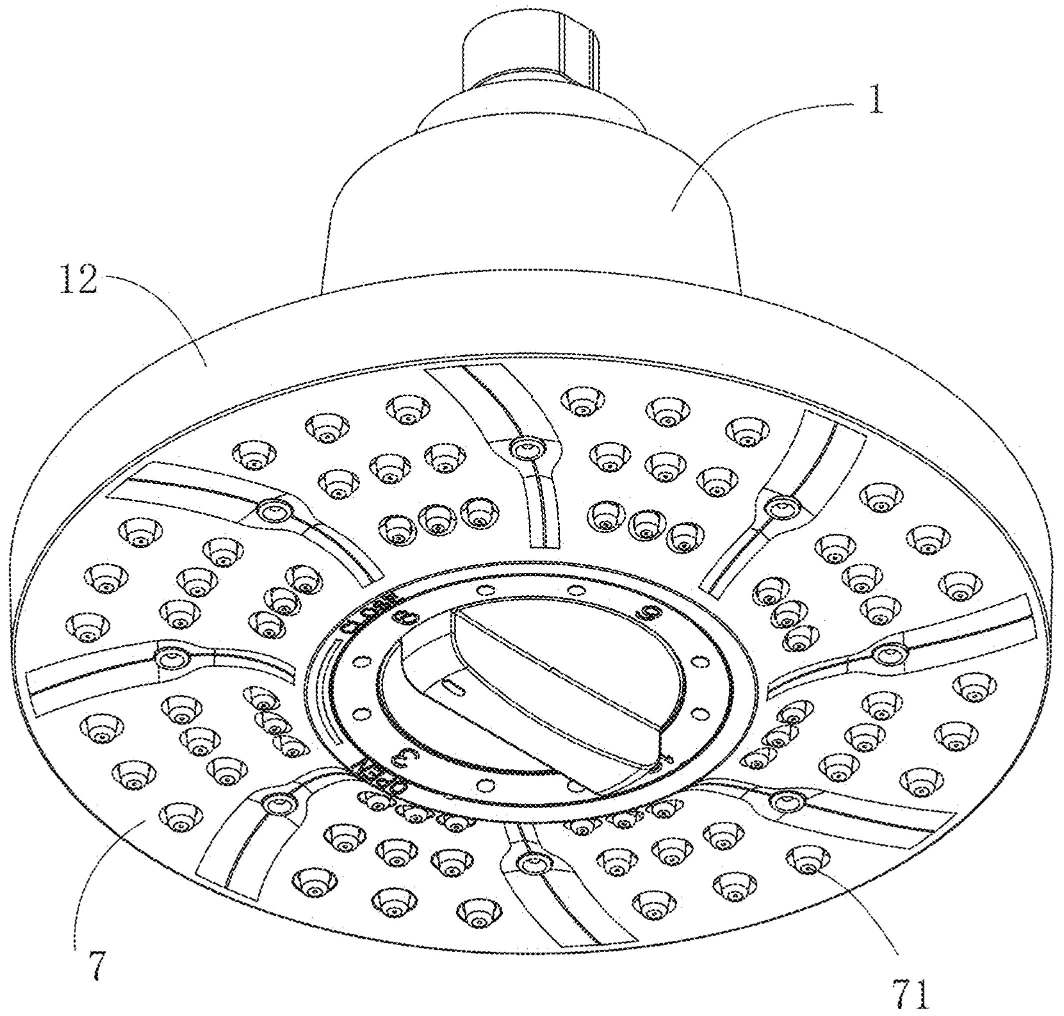
FIG. 15 is a structural view of a third spray head according to an embodiment of the present disclosure.

In another embodiment of the present disclosure, as shown in FIGS. 15 and 16, the filtration direction of the filter cartridge 3 is consistent with an outlet direction of the panel assembly 7. The panel assembly 7 arranged with an opening structure 1201. The cap 2 is embedded in an opening of the opening structure 1201 and is detachably connected to the opening structure 1201. When the cap 2 is installed in the opening of the opening structure 1201, a first end wall 23 of the cap 2 blocks the outlet end 32 of the filter cartridge 3. A first side wall 24 of the cap 2 may define at least one third water flow hole 231. The panel assembly 7 defines a gap or inlet passage corresponding to the at least one third water flow hole 231, allowing the filtered water to be delivered into the spray chamber 72 of the panel assembly 7. When the filter cartridge 3 needs to be replaced or cleaned, the cap 2 can be removed without a need to open an entire panel assembly 7, making the process quick and convenient. It is understood that the opening structure 1201 can also be arranged at the outlet end 32 of the filter cartridge 3, with the cap 2 embedded in the panel assembly 7 and detachably connected to the outlet end 32 of the filter cartridge 3. This design also facilitates the removal of the cap 2, enabling easy access for removal of the cap 2.

In an embodiment of the present disclosure, as shown in FIG. 16, the inlet wall 13 is arranged along the filtration direction of the filter cartridge 3. The inlet port 131 is defined in the inlet wall 13. In this way, the unfiltered water flows directly into the inlet end 31 of the filter cartridge 3 after exiting the inlet port 131, ensuring a high flow rate of water into the spray head.

In another embodiment of the present disclosure, as shown in FIGS. 9-14, the filtration direction of the filter cartridge 3 is approximately perpendicular to the water flow direction of the panel assembly 7. The filter cartridge 3 is arranged vertically. Therefore, the filter wall 11 forms a vertically oriented, nearly cylindrical structure. The filter cartridge 3 is mounted in the filter wall 11. The cap 2 is detachably mounted to the filter wall 11 at a bottom opening of the filter wall 11, allowing the filter cartridge 3 to be replaced and cleaned by simply removing the cap 2, without the need to disassemble the entire spray head. The filtered water, after being blocked by the cap 2, flows back to the spray chamber 72 of the panel assembly 7. The vertically arranged cylindrical structure can provide enough space for installation of the filter cartridge 3 and offers a buffer area for the water flow, allowing the water flow to stabilize and distribute more evenly before entering the panel assembly 7.

In an embodiment of the present disclosure, as shown in FIG. 10, optionally, the cap 2 is arranged at the bottom opening of the filter wall 11. The spray chamber 72 is located at a center of the panel assembly 7. The filter cartridge 3 and the filter wall 11 may be spaced apart from each other to cooperatively define a third water passage 6. After being redirected by the cap 2, the filtered water passes through the second water passage 5, enters the third water passage 6, and is transported back to vicinity of the spray chamber 72 via the third water passage 6. It is understood that the third water passage 6 can also be formed by a pipeline.

In an embodiment of the present disclosure, as shown in FIGS. 10-12 and 14, optionally, the spray chamber 72 is positioned at the center of the panel assembly 7. In this case, a second water flow hole 73 described below is also located at the center of the panel assembly 7. Therefore, a water passage chamber 115 needs to be formed above the filter cartridge 3. The filtered water flows through the second water passage 5 and the third water passage 6 to the water passage chamber 115. After gathering in the water passage chamber 115, the filtered water enters the at least one first water flow hole 111 and then flows into the at least one second water flow hole 73. The water passage chamber 115 is formed from a remaining space after installation of the filter cartridge 3 in a space defined by the filter wall 11. It is understood that the water passage chamber 115 can be omitted. When the third water passage 6 is implemented as a pipe, the at least one first water flow hole 111 can be directly connected to the pipe.

Figure 11:
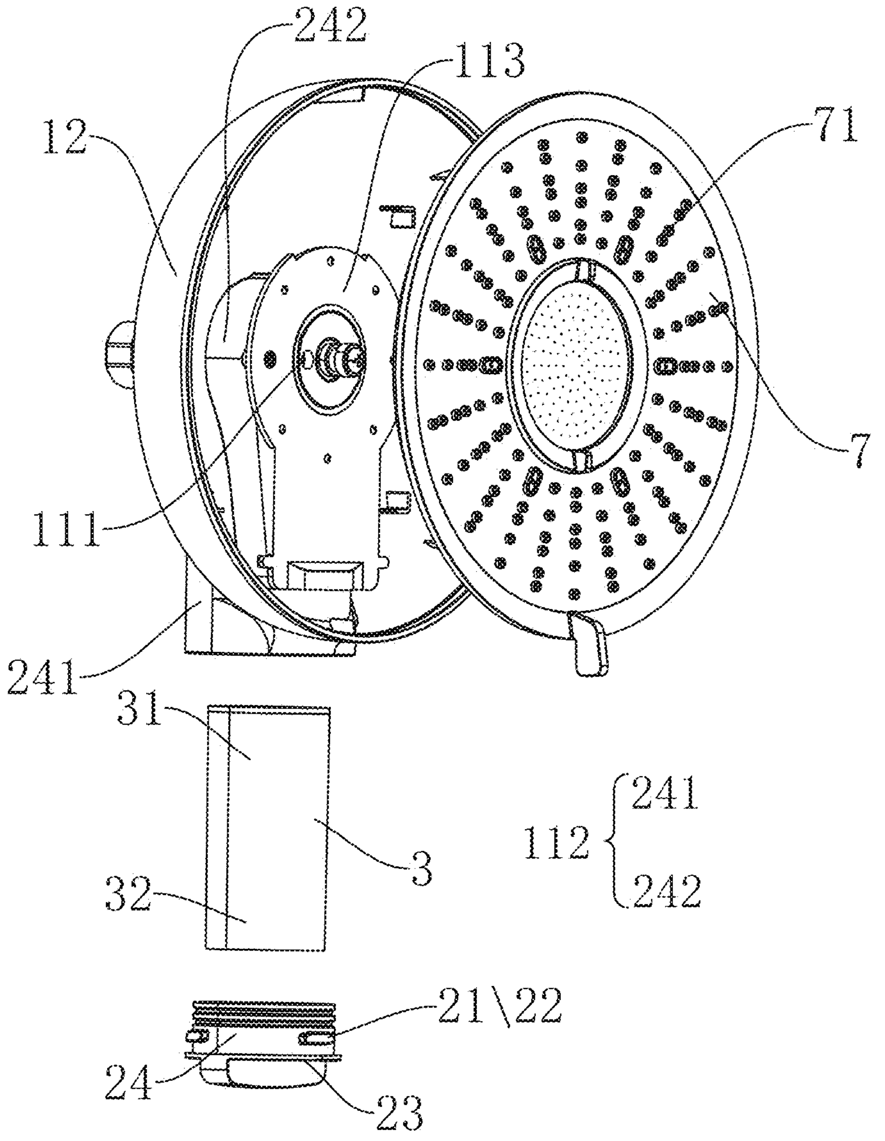
FIG. 11 is an exploded view of the second spray head according to an embodiment of the present disclosure.

In another embodiment of the present disclosure, as shown in FIG. 11, the second end wall 113 is arranged along the filtration direction of the filter cartridge 3, i.e., vertically. The second end wall 113 faces the panel assembly 7, and the at least one first water flow hole 111 is defined in the second end wall 113. The second side wall 112 includes an outer vertical wall 241 and an inner peripheral wall 242. The mounting wall 12 arranged to surround the outer vertical wall 241 and the inner peripheral wall 242. The outer vertical wall 241 is exposed outside the mounting wall 12, forming a curved face. The inner peripheral wall 242 and the second end wall 113 are arranged in a cavity defined by the mounting wall 12. The outer vertical wall 241, the inner peripheral wall 242, and the second end wall 113 cooperatively form a cylindrical-like structure. Design of exposing the outer vertical wall 241 and hiding the inner peripheral wall 242 and the second end wall 113 not only presents a clean and smooth appearance visually but also provides space for guiding and distributing the water flow.

Figure 12:
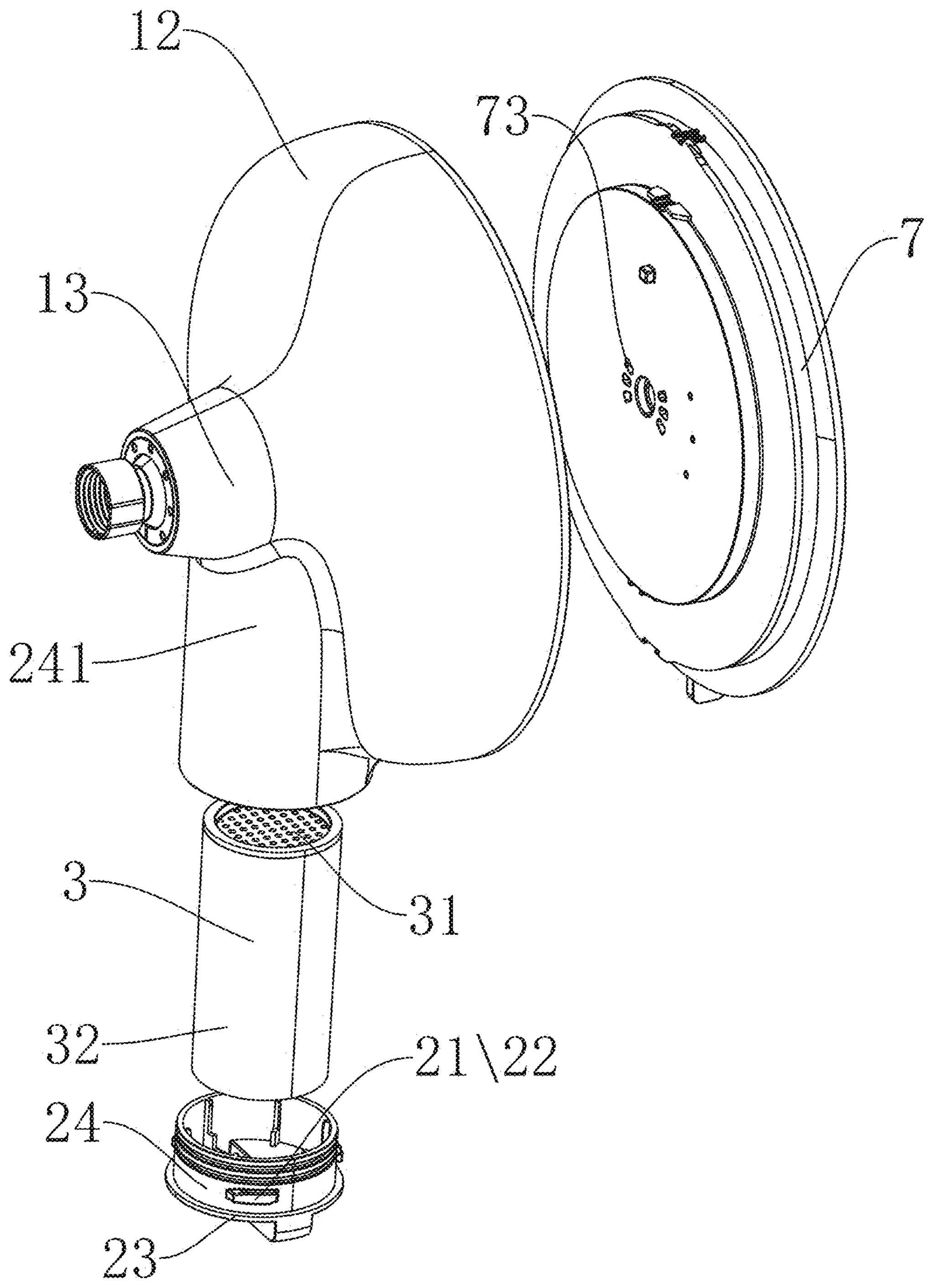
FIG. 12 is another exploded view of the second spray head according to an embodiment of the present disclosure.

In an embodiment of the present disclosure, as shown in FIGS. 11 and 12, at least one first water flow hole 111 is defined in the second end wall 113, and at least one second water flow hole 73 is defined in the panel assembly 7. The at least one first water flow hole 111 selectively communicates with the at least one second water flow hole 73. The water in the water passage chamber 115 flows sequentially through the at least one first water flow hole 111 and the at least one second water flow hole 73, and ultimately enters the spray chamber 72. Similarly, in the present disclosure, when the number of the at least one second water flow hole 73 is at least two, a second water flow hole 73, which is communicated with a corresponding first water flow hole 111, can be switched to another second water flow hole 73 by rotating the panel assembly 7. Each second water flow hole 73 corresponds to a different spray chamber 72, allowing the user to select different spray holes 71 for water output, thereby providing multiple water flow modes for the user's choice.

In another embodiment of the present disclosure, as shown in FIGS. 10 and 14, a portion of the inlet pipe head 132 is arranged to extend into the filter chamber 114, and the inlet pipe head 132 is directly connected to the inlet end 31 of the filter cartridge 3 via a cover 133. The cover 133 is arranged on the inlet pipe head 132 at the outlet port 1321 and is communicated with the outlet port 1321. In this way, the unfiltered water can enter the filter cartridge 3 efficiently and orderly, preventing mixing of the unfiltered and filtered water that could affect filtration performance. The cover 133 and the inlet end 31 of the filter cartridge 3 can be connected by threads or in a snap-fit connection, allowing for easy disassembly and reassembly of the filter cartridge 3 by simply removing the cap 2 without requiring complex disassembly of the entire spray head.

Figure 5:
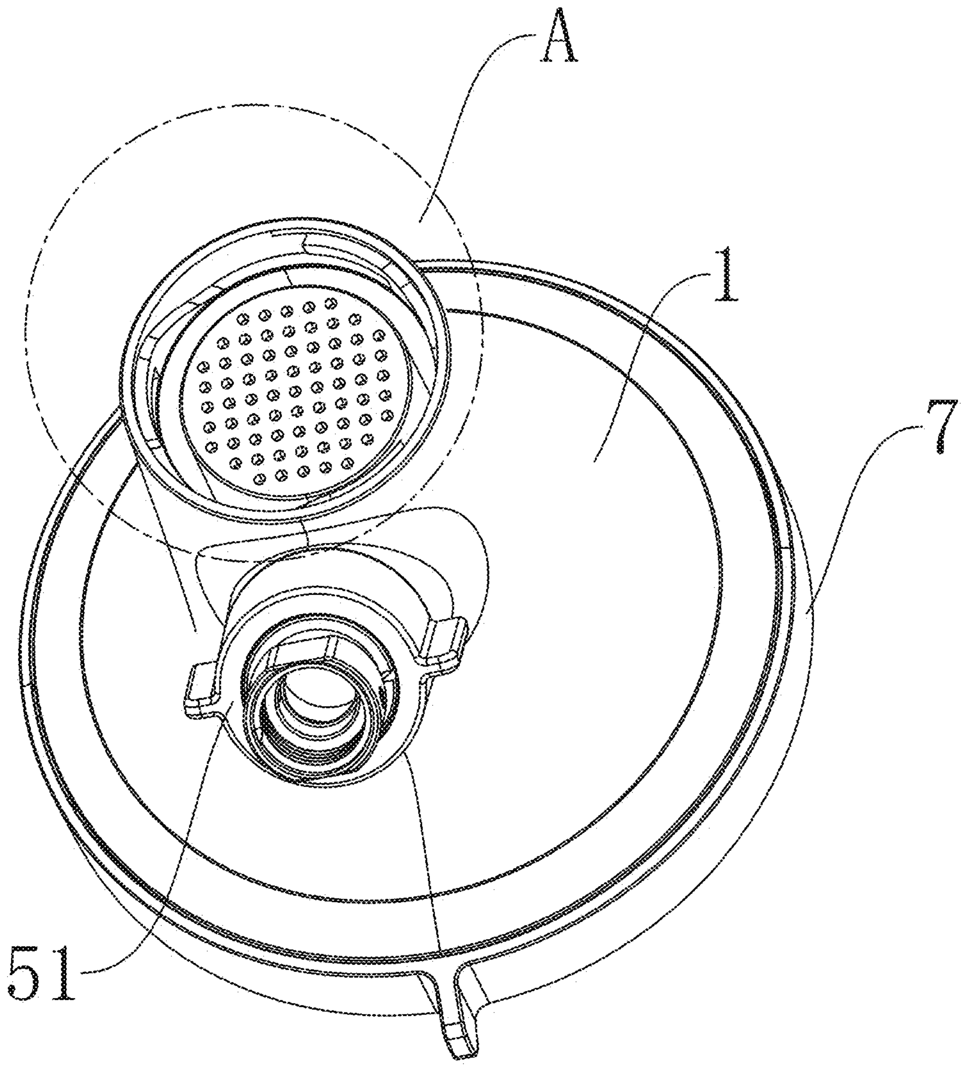
FIG. 5 is a partial structural view of the first spray head according to an embodiment of the present disclosure.
Figure 13:
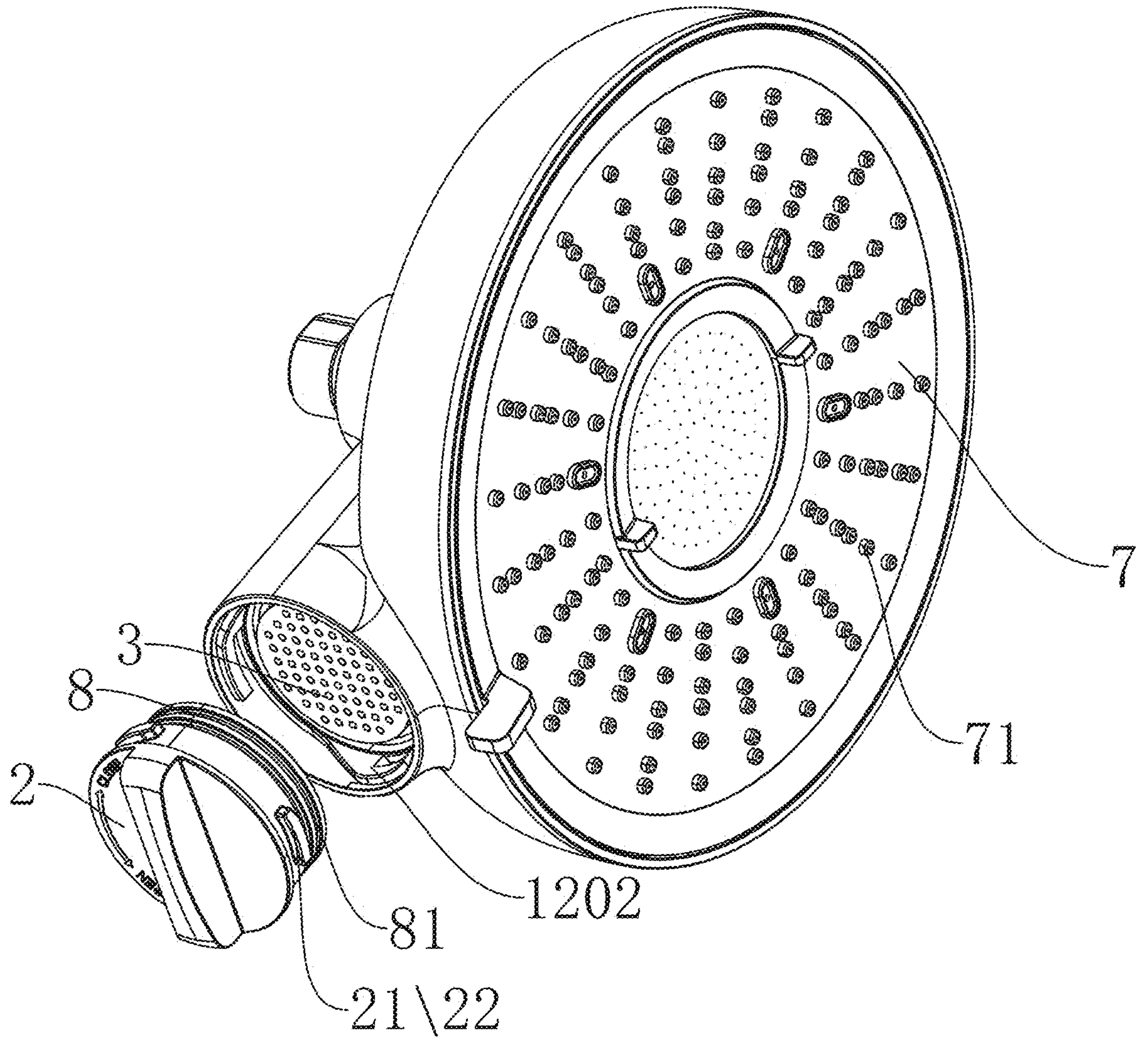
FIG. 13 is a partial exploded view of the second spray head according to an embodiment of the present disclosure.

In an embodiment of the present disclosure, as shown in FIGS. 5 and 13, the opening structure 1201 can be arranged on the housing 1 or the panel assembly 7. The opening structure 1201 includes an inner side wall 120. The inner side wall 120 is arranged with at least one guiding groove structure 1202. The cap 2 includes a first end wall 23 and a first side wall 24. The first side wall 24 is connected to a periphery of the first end wall 23. The first side wall 24 is arranged with at least one guiding block structure 21. Each guiding block structure 21 can be rotatably and snapped into a groove of a corresponding guiding groove structure 1202. By the guiding groove structure 1202 and the guiding block structure 21, the cap 2 can be rotated to be assembled to the opening structure 1201 or can be rotated in reverse to open the opening of the opening structure 1201, allowing for easy and quick replacement of the filter cartridge 3. The first side wall 24 further defines a sealing groove 81. Further, a sealing ring 8 is arranged in the sealing groove 81 to ensure a sealed connection between the cap 2 and the opening structure 1201.

Figure 6:
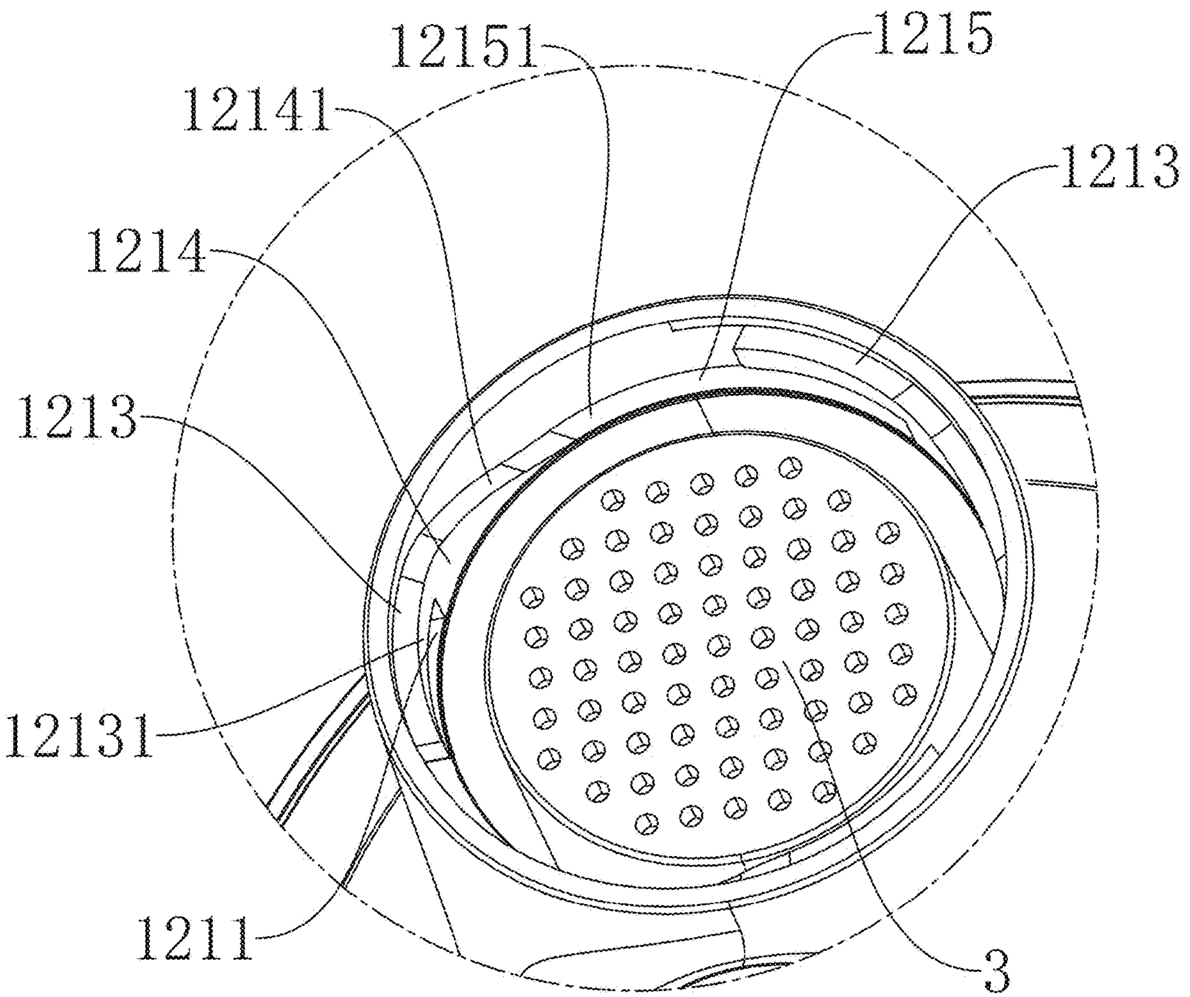
FIG. 6 is an enlarged view of a portion A in FIG. 5.

In another embodiment, as shown in FIGS. 4-6, one of the guiding groove structures 121 includes at least an extending portion 1213, a body portion 1214, and a guiding portion 1215 connected to each other in sequence. The body portion 1214 includes an inclined face 12141 that slopes downward. The guiding portion 1215 is connected at a lowest point of the inclined face 12141 and extends along a periphery of the opening structure 1201. An upper face 12151 of the guiding portion 1215 is flush with the lowest point of the inclined face 12141. Contrary to the guiding portion 1215, the extending portion 1213 extends from an upper half part of the body portion 1214, and is connected with a highest point of the inclined face 12141. The upper face 12131 of the extending portion 1213 is flush with the highest point of the inclined face 12141. The upper face 12131 of the extending portion 1213, the inclined face 12141 of the body portion 1214, and the upper face 12151 of the guiding portion 1215 cooperatively form the guiding face 1212. The number of the guiding groove structure 1202 is more than one. A guiding portion 1215 of one of the more than one guiding groove structure 1202 and an extending portion 1213 of a guiding groove structure 1202 adjacent to the one of the more than one guiding groove structure 1202 cooperatively define an opening groove 1211. A size of the guiding block structure 21 matches a size of the opening groove 1211, allowing the cap 2 to be snapped into the opening groove 1211 through guidance of the guiding face 1212 during a rotating process of the cap 2, completing assembly of the cap 2 with the opening structure 1201 of the housing 1. When the cap 2 needs to be removed, the cap 2 can be rotated in reverse. Specifically, each of the at least one guiding block structure 21 is arranged as a boss 22, an opening direction of the opening groove 1211 is consistent with a screw-in direction of the boss 22, and the boss 22 is capable of being screwed into or out of the opening groove 1211 by rotation. Further, the guiding face 1212 is at least partially inclined, and the guiding face 1212 is communicated to the opening groove 1211 and is configured to guide the boss 22 to the opening groove 1211. Design of the guiding groove structure 1202 and the guiding block structure 21 can further ensure that the cap 2 may not misalign while being mounted, ensuring an accurate connection of the cap 2.

In an embodiment of the present disclosure, after flowing out from the outlet end 32, the filtered water enters the spray chamber 72 and is sprayed from the plurality of spray holes 71 without passing by the cap 2.

In an embodiment of the present disclosure, the cap 2 is arranged at the inlet end 31.

In an embodiment of the present disclosure, after flowing out from the outlet end 32, the filtered water enters the spray chamber 72 in a direction away from the cap 2.

In an embodiment of the present disclosure, after entering the filter chamber 114 via the inlet port 131, the unfiltered water enters the inlet end 31 in a direction away from the cap 2.

In an embodiment of the present disclosure, the cap 2 is detachably connected to a first side of the housing 1. After flowing out from the outlet end 32, the filtered water enters the spray chamber 72 in a direction approximately parallel to a filtration direction of the filter cartridge 3. After the cap 2 is detached from the first side of the housing 1, the filter cartridge 3 is capable of being taken out from or being mounted in the filter chamber 114 from the first side of the housing 1.

In an embodiment of the present disclosure, the filtration direction of the filter cartridge 3 is approximately parallel to an outlet direction of the panel assembly 7.

It is to be understood that the various technical features described above may be combined in various ways to form different embodiments not explicitly listed above, which are considered within the scope of the present disclosure. Additionally, those skilled in the art may make improvements or changes based on the above description, and all such improvements and changes are intended to fall within the protection scope of the appended claims.

What is claimed is:

1. A spray head, comprising:

a housing, defining an inlet port;

a cap, wherein the housing and the cap cooperatively define a filter chamber;

a filter cartridge, disposed in the filter chamber and comprising an inlet end and an outlet end, wherein unfiltered water enters the filter cartridge sequentially through the inlet port and the inlet end, and filtered water exits the filter cartridge through the outlet end; and a panel assembly, mounted on the housing and defining a plurality of spray holes and a spray chamber, wherein the filtered water enters the spray chamber and the filtered water is sprayed from the plurality of spray holes;

wherein the filter chamber has a chamber opening at an end of the housing; the filter cartridge is mounted into the filter chamber through the chamber opening or the filter cartridge is taken out of the filter chamber through the chamber opening;

the cap is detachably connected to the housing at a position where the chamber opening is located; the cap is dis-connected from the filter cartridge when the filter cartridge is taken out of the filter chamber;

the cap is configured to block the unfiltered water at the inlet end, and the unfiltered water enters the inlet end after being redirected by the cap; or the cap is configured to block the filtered water at the outlet end, and the filtered water enters the spray chamber after being redirected by the cap.

2. The spray head as claimed in claim 1, wherein the cap comprises a first end wall and a first side wall, the first end wall is configured to block the unfiltered water at the inlet end;

the first side wall, the first end wall, and the inlet end of the filter cartridge cooperatively define a first water passage, and the unfiltered water is redirected in the first water passage.

3. The spray head as claimed in claim 2, wherein the housing comprises:

a filter wall, detachably connected to the cap, wherein the filter wall and the cap cooperatively form the filter chamber, and the cap is arranged proximate to the inlet end of the filter cartridge;

an inlet pipe wall, connected to the filter wall, wherein the inlet port is defined in the inlet pipe wall; and a mounting wall, extending outwardly along the filter wall, wherein the panel assembly is arranged on the mounting wall.

4. The spray head as claimed in claim 3, wherein an inlet direction of the inlet port forms an angle with an axial direction of the filter cartridge, and the unfiltered water, after entering the inlet port, is directed to the first water passage under obstruction of the filter cartridge.

5. The spray head as claimed in claim 3, wherein the filter wall defines at least one first water flow hole, and the panel assembly defines at least one second water flow hole, the at least one first water flow hole is communicated with the at least one second water flow hole correspondingly, and the filtered water flows sequentially from the outlet end, through the at least one first water flow hole and the at least one second water flow hole to the spray chamber.

6. The spray head as claimed in claim 5, wherein the filter wall comprises a second side wall and a second end wall, the second side wall comprises a first end and a second end, the cap is detachably mounted at the first end and is configured to block an opening defined in the first end;

the second end wall is located at the second end, the cap is configured to limit one end of the filter cartridge, and the second end wall is configured to limit the other end of the filter cartridge.

7. The spray head as claimed in claim 1, wherein the cap comprises a first end wall and a first side wall, the first end wall is configured to block the filtered water;

the first side wall, the first end wall, and the outlet end of the filter cartridge cooperatively form a second water passage, and the filtered water is redirected in the second water passage.

8. The spray head as claimed in claim 7, wherein the housing comprises:

a filter wall, detachably connected to the cap, wherein the filter wall and the cap cooperatively form the filter chamber, and the cap is arranged proximate to the outlet end of the filter cartridge; and a mounting wall, extending outwardly along the filter wall, wherein the panel assembly is arranged on the mounting wall.

9. The spray head as claimed in claim 8, wherein the panel assembly is arranged to surround the cap, the first side wall defines at least one third water flow hole, the at least one third water flow hole is communicated to the spray chamber, and the filtered water sequentially flows from the outlet end, through the second water passage and the at least one third water flow hole to the spray chamber.

10. The spray head as claimed in claim 8, wherein a filter direction of the filter cartridge is substantially perpendicular to an outlet direction of the panel assembly.

11. The spray head as claimed in claim 10, wherein a third water passage is defined between the filter cartridge and the filter wall along the filter direction, and the third water passage is communicated with the second water passage.

12. The spray head as claimed in claim 11, wherein the filter chamber comprises a water passage chamber, the water passage chamber is communicated with the third water passage, and the filtered water sequentially flows from the outlet end, through the second water passage, the third water passage, and the water passage chamber to the spray chamber.

13. The spray head as claimed in claim 12, wherein the filter wall comprises a second side wall and a second end wall, the cap is detachably mounted on the second side wall, and the second end wall is arranged along the filter direction and proximate to the panel assembly.

14. The spray head as claimed in claim 13, wherein at least one first water flow hole is defined in the second end wall, and at least one second water flow hole is defined in the panel assembly, the at least one first water flow hole is communicated with the at least one second water flow hole correspondingly, and the filtered water in the water passage chamber enters the spray chamber through the at least one first water flow hole and the at least one second water flow hole.

15. The spray head as claimed in claim 1, wherein, a seal ring is disposed between an outer wall of the cap and an inner wall of the housing; and the seal ring is further disposed between the inlet port of the housing and the inlet end of the filter cartridge or the seal ring is further disposed on a water flowing path from the outlet end of the filter cartridge towards the spray chamber of the panel assembly.

* * * * *